Nov. 1, 1966 E. DACCO 3,281,899
INJECTION MOLDING APPARATUS WITH PLURAL RECIPROCATING SCREWS
Filed Jan. 27, 1964
2 Sheets-Sheet 1
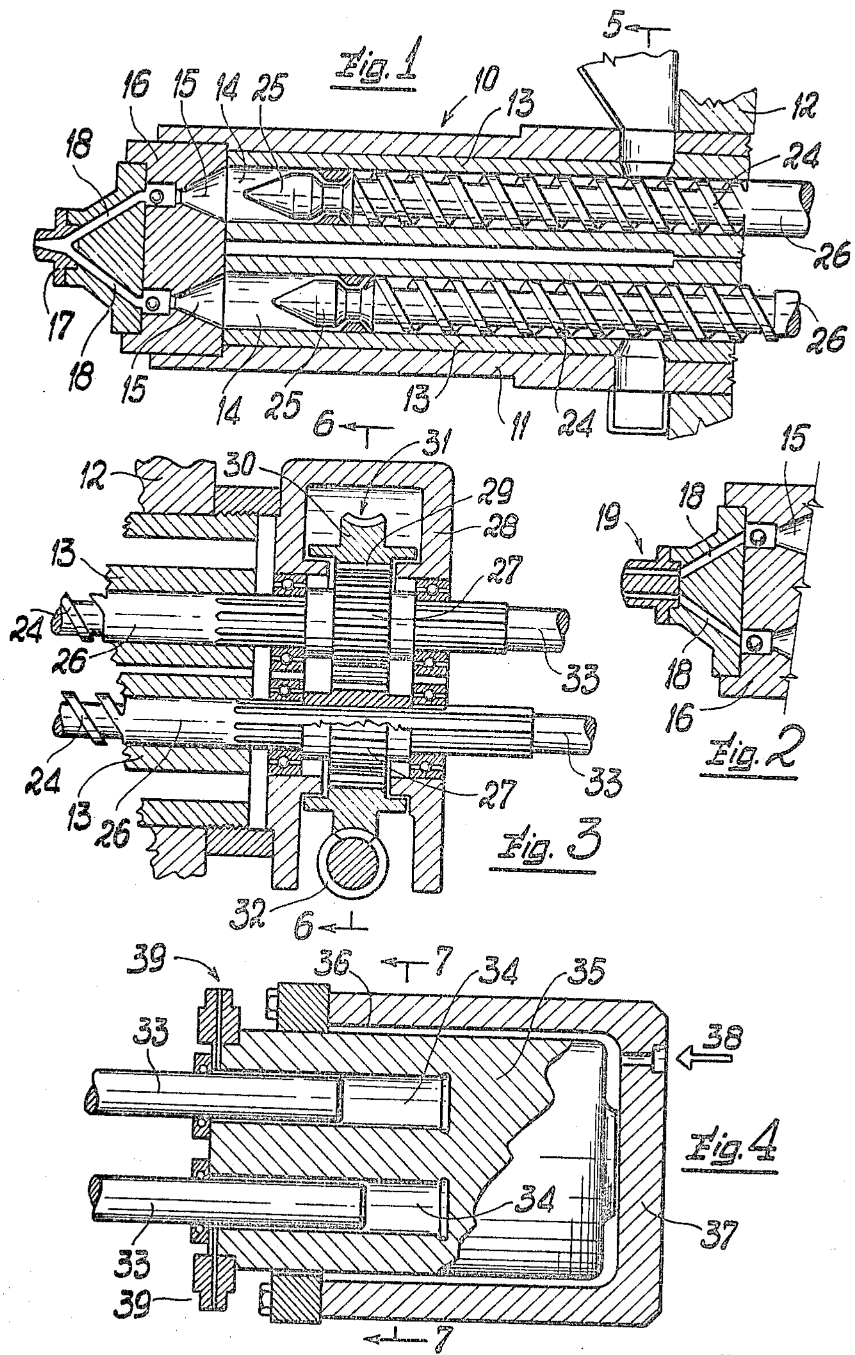
INVENTOR.
Ernesto Dacco
BY
Michael S. Striker
Attorney

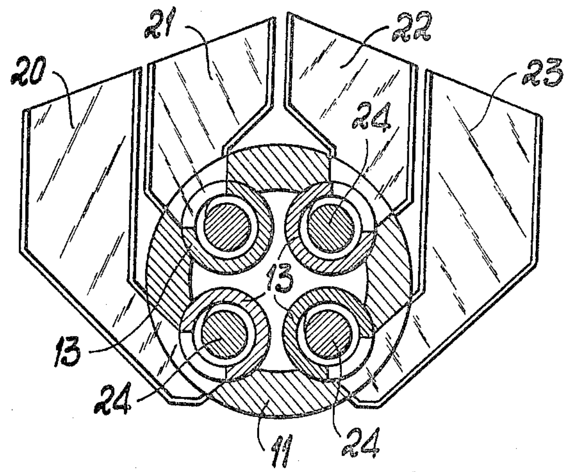
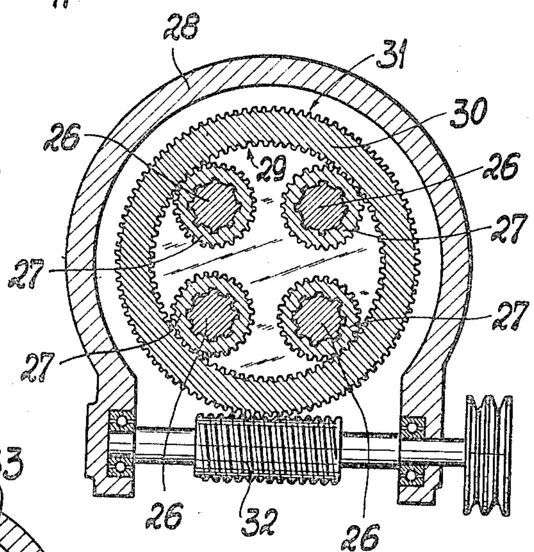
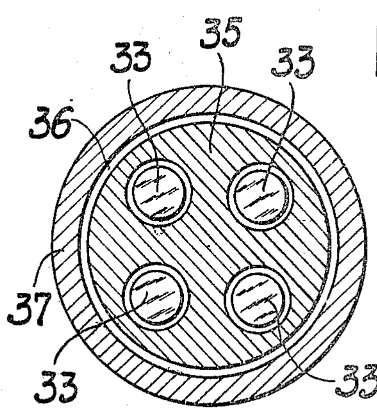
INVENTOR.
Ernesto Dacco
BY
Michael S. Striker
Attorney United States Patent Office 3,281,899

Patented Nov. 1, 1966

3,281,899
INJECTION MOLDING APPARATUS WITH PLURAL RECIPROCATING SCREWS

Ernesto Dacco, 2 Via Villapizzone, Milan, Italy

Filed Jan. 27, 1964, Ser. No. 340,412
Claims priority, application Italy, Jan. 28, 1963, 1,684/63
6 Claims. (Cl. 18—30)

This invention relates generally to machines for injection molding or die casting of plastics, that is, molding machines of the kind wherein the heat-softened plastic material is forced or injected from a pressure cylinder by a ram therein into a mold cavity to form the molded article.

More particularly, this invention is concerned with a new and advantageous injection molding machine of the type wherein ram means are provided with a plasticizing feed screw formed about the ram stem portion and arranged in a suitably heated cylinder either for axial reciprocation and for rotation in said cylinder to actuate a plasticizing and injection unit therewith. The fore portion of said cylinder embodies a pressure chamber communicating with an injection nozzle for injecting the pressurized and plasticized material into a mold cavity upon forward and operative stroke of said ram which, during the injection step, acts as a plunger in said pressure chamber. The rear portion of said cylinder has a port adapted to receive the raw pulverulent molding compound from a supply hopper or other suitable supply means, said compound material being progressively and essentially continuously progressed towards and into said pressure chamber upon rotation of the ram, which therefore acts as a feed screw, and heat-softens and plasticizes the material as progressed from said hopper to said pressure chamber.

Such plasticizing and injection machines are conventionally provided with suitable drive means for continuously rotating the ram about its axis within said cylinder, and with a power fluid actuated piston connected to the rear portion of said ram for forwardly forcing said ram along said cylinder whereby said ram acts as a plunger into said pressure chamber to perform the injection step.

Upon performance of any injection step, the backward or return stroke of said ram is generally ensured by the pressure built-up in said pressure chamber upon the progressive feeding of plasticized material thereinto as the said plasticizing and feed screw forming ram is continuously rotated and supplied from said hopper, said pressure being at its turn ensured by the resistance encountered by the said power fluid actuated piston as the latter is backwardly urged by said ram into a cooperating power cylinder. Such resistance is suitably adjusted upon control of the rate of outflow of the fluid, such as preferably water, from said power cylinder.

As known by those skilled in the art to which this invention appertains, the control and proper adjustment of the resistance encountered by the ram during its return stroke, i.e. during the filling or re-loading of the pressure chamber with a predetermined amount of plasticized and already substantially pressurized plastic material, substantially improves the operation of the machine and the article molded thereby, as said material in said chamber will be properly compressed, plasticized, without air or gaseous bubbles and generally well adapted for injection molding thereof.

It is further known that an injection molding machine having an injection and plasticizing unit constructed and operating as summarized above, is capable of very satisfying production of high quality plastic articles at the most desirable production rate. Such machines are however subject to the serious objection that the amount of plasticized material which may be satisfyingly fed and injected at each cycle of operation cannot be greater than a given relatively small quantity.

Therefore such machines cannot be properly used for injection molding of relatively big and heavy articles. Such limitation is acknowledgedly due to the fact that the plasticizing feed screw can be constructed only within certain dimensional limits, namely the diameter of said screw, the cross-sectional area of the helical groove thereof and the pitch of said groove, cannot be increased over well known values for ensuring the most desirable heat-exchange and throughout plastification of the molding compound, and to prevent undesirable time extension between the cycles of operation.

In addition, while a substantial pressure in the pressure chamber, as the latter is being progressively fed with plasticized material, has been proved very advantageous for best performance of the subsequent injection step, the said material must be however injected from said chamber as soon as possible upon its pressurization to prevent certain detrimental phenomena occurring in same pressurized material.

Having the above and other consideration in mind, it is therefore a principal object of this invention to provide a new and advantageous injection molding machine which is not subject to the above and other limitations.

More particularly, it is an object of this invention to provide a new injection molding machine of the type referred to above, which comprises a plurality of feeding, plasticizing and injection molding units each having a pressure chamber and a rotatable and reciprocatable plunger and feed screw forming ram, drive means for simultaneously rotating said rams, one fluid actuated power piston connected to all said ram for simultaneously imparting to all rams their operative forward stroke, duct means connecting each pressure chamber of said units to injection nozzle means for concurrently injecting plasticized material therefrom as all rams are being operatively reciprocated, and individual return stroke controlling means for each ram respectively to said one fluid actuated power cylinder for individual adaptation of said return stroke to the feeding and re-loading of each pressure chamber preparatory of simultaneous subsequent operatives stroke of all rams—whereby an improved machine is provided, said machine being capable of properly injection molding at each cycle of operation thereof an amount of plastic material equal to the sum of the amounts individually fed, plasticized and injected by each individual unit, while the limitations relatively to dimension and time intervals of operation are obeyed as being corresponding to the operative conditions of each individual unit included in said plurality.

These and other important objects and advantages of the invention will be apparent to those skilled in the art upon consideration of the description below in connection with the accompanying drawings, forming an essential component of this disclosure and wherein a preferred embodiment of the invention is described without intent to limit the invention thereto; in the drawings:

FIGURE 1 is a fragmentary longitudinal sectional view of the fore portion of the machine, including the plasticizing and injection units, said view being taken in a plane including the axes of two of said units;

FIGURE 2 fragmentarily and similarly shown a modified injection nozzle means alternative of the nozzle shown in FIG. 1;

FIGURE 3 is a corresponding fragmentary longitudinal sectional view of a middle portion of the machine, including drive means for simultaneously rotating all rams of said units;

FIGURE 4 is a similar showing of the rear portion of the machine, including the fluid actuated power means for reciprocating said rams; and FIGURES 5, 6 and 7 are cross-sectional views of the said portions of the machine, taken generally on the lines 5—5 of FIG. 1, and respectively 6—6 of FIG. 3 and 7—7 of FIG. 4.

Referring now to the drawings, wherein like reference numerals refer to like parts and components throughout the several figures, and wherein the machine is illustrated in a greatly diagrammatical and simplified manner, with respect to the components essential for full understanding of the invention only, all other components, means and device known in and conventional of the art (such as, for example, heating means, pressurized fluid supply means, motors and controls) being omitted:

The machine, as far as the invention is concerned, may be considered to include a structure including three aligned portions, i.e. a fore portion, illustrated in FIG. 1, a middle portion and a rear portion, illustrated in FIGS. 3 and 4, respectively, said portions being shown in the drawing as not aligned, for purpose of scale and of spacing. All said portions are suitably supported on and by a conventionally constructed frame structure (not shown) and the machine will be combined with conventionally constructed and operated mold supporting and operating means (not shown). The invention is concerned to the operative part of an injection molding machine of the kind above indicated, designed for supplying, plasticizing and injection extruding the molding material from a suitable nozzle means only.

The machine includes generally a fore structure 10 having an essentially cylindrical casing 11 fixedly secured to a frame component fragmentarily shown at 12 in FIGS. 1 and 3. Said casing 11 defines a longitudinal axis of the machine and a plurality of for example four, cylinders 13 are supported within said casing 11 in parallel relationship with and evenly spaced about the axis of said casing 11.

Said cylinders 13, preferably of equal dimensions, are bored to rotatably and reciprocably accommodate each a ram therein and each one of said cylinders form a pressure chamber 14 at its fore end portion.

Each cylinder 13 abuts at its fore end on the face of a block 16 at the fore portion of casing 11 and having tapered passages 15 formed thereinto. Each tapered passage 15 is combined with the fore portion of an individual cylinder 13 to complete the respective pressure chamber 14 and for communicating each chamber with injection nozzle means 17, through converging ducts 18.

Said ducts include suitable conventional valve means to prevent feed-back of plastic material and have closely arranged outlets, so that all said ducts may be made concurring into one injection nozzle passage as shown in the nozzle means 17 of FIG. 1, if concurrency of all material injected from all units into one part of mold cavity is desired. In such case, the machine may inject in one cavity of one mold or die an amount of plastic material, which corresponds to the sum of all amounts of the several individual units.

On the contrary, if amounts of like or even differing molding materials are to be injected within separate parts of a mold, a nozzle unit of the type shown at 19 in FIG. 2 may be applied to the fore end of the machine, said nozzle 19 being provided with two or more orifices each connected, by suitable ducts, for example as shown in FIG. 2, to one or more injection unit or units. It is obvious that the machine may be provided with a set of interchangeable nozzle units, having differing number of injection orifices and/or differing combination of ducts, for meeting the various production requirements.

According to an important feature of the invention, the various cylinders 13 are connected to and fed by individually associated hoppers, such as shown in FIG. 5, wherein four hoppers 20 to 23 are arranged about the casing 11 and provided with shaped outlet portions arranged for communication of each individual hopper with one defined corresponding individual injection unit.

Such provision allows, for example, the injection molding of one article with a combination of molding material which, preferably, must be kept apart until plastification, and/or with variously colored material which which will mix together into a marble-like pattern in the molded article, and so on.

Each injection unit plunger assembly includes a ram adapted for rotation and for axial reciprocation in one cylinder 13. Each ram includes a plasticizing feed screw forming helically grooved portion 24, a plunger forming fore or head portion 25 and a rearwardly extended portion 26. Each ram 24–26 is drivedly connected to a drive device for simultaneous rotation of all rams within their respective cylinders, without prejudicing the back-and-forth movement of same rams, as required for reciprocating the plungers for the purpose of injection and re-loading steps. A preferred example of such device is shown in FIGS. 3 and 6.

Each rearwardly extended stem portion 26 of said rams 24–26 has a longitudinally grooved part to which a pinion 27 is keyed for relative movement therealong and for rotary engagement therewith. All said pinions 27 are in mesh with the inner toothing 29 of a ring gear 30, rotatably supported about the axis of casing 11 within a protection casing 28, and provided with an outer toothing 31 connected to a suitable source of rotary motion (not shown), by means of a worm gear 32, for example, and a V-belt transmission. Therefore, as the said ring gear 30 is driven, all rams 24–26 are caused to simultaneously rotate for supplying pressurized and plasticized molding material into the pressure chamber 14 of the parent cylinder 13 of corresponding individual units.

According to a further important feature of the invention, the machine is provided with a fluid actuated, such as a hydraulic powered power device for simultaneously forwardly urging all rams to perform the simultaneous and concurrent injection step of all units, and adapted for individual performance of the return or backward stroke of any ram, upon adjustment and control of a resistance opposed to said latter stroke, in view of proper re-loading of the respective pressure chamber.

Such device is shown in FIGS. 4 and 7 and includes one power hydraulic cylinder 37 which may be conventionally fed at 38 with pressurized water and has a cylinder chamber 36 wherein a power piston 35 may be conventionally reciprocated. Each ram unit 24–26 has its stem portion rearwardly extended to actuate a rear plunger or piston 33 (FIGS. 3, 4 and 7) slidably arranged into correspondingly aligned minor cylinder 34 bored in said power piston 35, each minor cylinder 34 having an individual duct 39 connected thereto for controlled inlet and outlet of a fluid, such as water for example, thereinto and thereout.

Therefore, as any one of rams 24–26 is individually caused to retreat as, upon its rotation, its feed screw portion progressively supplies plastified material into the related pressure chamber 14, its individual backward motion will be individually contrasted by the resistance opposed by the fluid, such as water, forced outside from its individually related minor cylinder 34. The ram units shown in FIGS. 1, 3 and 4 have been willingly illustrated as being in slightly differing axial relative positions, as it may occur (and as generally occurs) during the return stroke of the various rams, as a result of unavoidable differences in the feeding of plasticized material in the various units, while all rams would obviously perform their individual return strokes substantially in the same time.

Such independence of each unit in respect to the others in view of return stroke of its individual ram and consequent re-loading of its pressure chamber has been proved as essential for effective operation of the machine. As a matter of fact, it is acknowledged in the art that injection molding machines, having one ram which acts either as a plunger and as a plasticizing feed screw, can effectively operate only when the ram is not subject to an externally applied back-pull for causing the return stroke thereof, and it is on the contrary retreated only by the pressure built-up in the related pressure chamber by the plasticized material progressively supplied thereinto by the action of the feed screw.

In addition, it has been acknowledged in the art that the preliminary pressure built-up in the pressure chamber of such machines, by the action of feed screw, preparatory to the application of the high injection pressure caused by the forward stroke of the ram, may be advantageously adjusted according to the particular character or compounding of the plastic material, for best production of the molded article.

Now, as the machine of the invention includes a plurality of injection units which may concurrently and simultaneously inject differing plasticized materials (as many materials as many units are included and combined in the machine) and as the return stroke of each individual ram of said units may be separately and individually controlled upon control of the pressure of outwardly urged fluid at each individual outlet at 39 of the several minor cylinders 34, it will be apparent that the machine of the invention may be readily adapted for concurrently processing, in one or more mold parts, of plastic materials of even noticeably differing characters and compoundings.

Such individual adaptation of each unit to differing requirements may be further improved by providing individual controls and adjustment for the conventionally constructed and arranged heating means (not shown) provided for heating the material within each individual cylinder 13.

The machine will be ready for its injection stroke when all pressure chambers 14 thereof will be properly reloaded, i.e. all rams of the machine will have completed their individual return strokes. To prevent not proper operation of the machine, means might be readily conceived and devised to prevent that pressure might be applied at 38 to the hydraulic power cylinder 37 if one or more rams have not been fully retreated, for example.

It is thus seen that there has been provided a new and improved injection molding machine which meets all the objects stated hereinabove. In addition, it will be realized that while but a single embodiment of the invention has been illustrated and described, it would be well within the skill of those familiar with art to devise other structural modifications and adaptations for accomplishing the objective of the invention, and it is not the intent to circumscribe the invention by the precise structure and combination described and which is merely by way of illustration of one means for practicing the inventive concept.

I claim:

1. An injection molding machine, comprising, in combination, a plurality of injection cylinders, each having a front end and forming at said front end a pressure chamber; nozzle means connected to said front ends of said injection cylinders and communicating with said pressure chambers; a plurality of ram means respectively supported in said injection cylinders for rotational movement and for movement in axial direction between a forward injection stroke for ejecting material from the respective pressure chamber through said nozzle means and return stroke, each of said ram means including a plunger forming front end portion, a helically grooved plasticizing and feedscrew forming middle portion, and a rear portion; supply means individually communicating with each of said cylinders in the region of said middle portion of the ram means therein for supplying plastic material into said cylinders; drive means connected to said plurality of ram means for simultaneously rotating the same so that plastic material supplied by the supply means is progressively fed under pressure while being plasticized into said pressure chambers; and fluid actuated means constructed and connected to said rear portions of all of said ram means for simultaneously moving the same through equal distances along said forward injection stroke for ejecting material from said pressure chambers through said nozzle means and for individually controlling the return stroke of each ram means under the influence of the pressure built up in the respective pressure chamber during continuous rotation of the respective ram means.

2. An injection molding machine comprising, in combination, a plurality of injection cylinders, each having a front end and forming at said front end a pressure chamber; nozzle means connected to said front ends of said injection cylinders and communicating with said pressure chambers; a plurality of ram means respectively supported in said injection cylinders for rotational movement and for movement in axial direction between a forward injection stroke for ejecting material from the respective pressure chamber through said nozzle means and return stroke, each of said ram means including a plunger forming front end portion, a helically grooved plasticizing and feedscrew forming middle portion, and a rear portion; supply means individually communicating with each of said cylinders in the region of said middle portion of the ram means therein for supplying plastic material into said cylinders; drive means connected to said plurality of ram means for simultaneously rotating the same so that plastic material supplied by the supply means is progressively fed under pressure while being plasticized into said pressure chamber; and fluid actuated means constructed and connected to said rear portions of all of said ram means for simultaneously moving the same through equal distances along said forward injection stroke for ejecting material from said pressure chambers through said nozzle means and for individually controlling the return stroke of each ram means under the influence of the pressure built up in the respective pressure chamber during continuous rotation of the respective ram means, said fluid actuated means comprising a power cylinder, a power piston reciprocatable in said power cylinder, a plurality of minor cylinders connected to said power piston for movement therewith, a plurality of minor pistons respectively connected to said plurality of ram means and respectively reciprocatable in said minor cylinders and arranged to progress thereinto as said ram means perform their return stroke, means for feeding pressure fluid into said minor cylinders and for individually controlling outflow of pressure fluid from each of said minor cylinders as said minor pistons progress thereinto so as to individually control the return stroke of each of said ram means, and means for feeding pressure fluid into said power pistons after said ram means have performed their return stroke for simultaneously and concurrently moving said plurality of ram means along said injection stroke.

3. An injection molding machine as set forth in claim 2, wherein said minor cylinders are in the form of bores in said power pistons.

4. An injection molding machine as set forth in claim 2, wherein said injection cylinders are arranged parallel to each other and uniformly spaced from each other about a longitudinal axis of said machine, and wherein said power cylinder is arranged coaxially with said axis.

5. An injection molding machine as set forth in claim 3, wherein said rear portions of said ram means are in the form of plungers forming said minor pistons.

6. An injection molding machine as set forth in claim 2, wherein said drive means comprise a plurality of pinions respectively coaxially arranged on said rear portions of said plurality of ram means and connected thereto for rotation therewith and for movement in axial direction thereof, and gear means connected to said pinions for simultaneously rotating the same.

References Cited by the Examiner

UNITED STATES PATENTS

| | | | |
|---|---|---|---|
| 2,672,650 | 3/1954 | Westerberg | 18—12 X |
| 2,916,769 | 12/1959 | Baigent | 18—30 |

FOREIGN PATENTS 570,933 12/1957 Italy.

J. SPENCER OVERHOLSER, *Primary Examiner.*

W. L. McBAY, *Assistant Examiner.*